United States Patent

Limbert

[15] 3,648,036

[45] Mar. 7, 1972

[54] CARD PUNCH READER ADAPTER

[72] Inventor: Raymond Walter Limbert, Bedford, Mass.

[73] Assignee: Viatron Computer Systems Corporation

[22] Filed: Oct. 22, 1969

[21] Appl. No.: 868,469

[52] U.S. Cl. ............ 235/154, 234/69

[51] Int. Cl. ............ G06f 3/00

[58] Field of Search ............ 235/61.1, 154, 155, 61.113; 340/347 DP; 178/26, 26.5; 234/69

[56] References Cited

UNITED STATES PATENTS

| | | | |
|---|---|---|---|
| 3,512,705 | 5/1970 | Baskin | 234/69 |
| 3,395,400 | 7/1968 | DeWitt | 235/154 |
| 3,277,281 | 10/1966 | Doubek | 235/61.1 |
| 3,090,833 | 5/1963 | Zenner | 235/155 |
| 2,918,654 | 12/1959 | Hillyer | 235/61.113 |

*Primary Examiner*—Maynard R. Wilbur
*Assistant Examiner*—Jeremiah Glassman

[57] ABSTRACT

A translator system for converting electrically or magnetically encoded signals from tape or other storage mediums to a punched card or vice versa. The apparatus may include a buffer circuit for periodically releasing the terminal equipment during the card punching operation or the reverse operation of translating prepunched cards to tape or other recording means. In addition, the translator circuit includes means to convert one punch card code such as the Hollerith code to a second code such as the ASCII code widely used for data transmission and the change data in a serial mode to a parallel mode and vice versa. These circuits are combined with a control system which permits the translating circuit to be used to prepare or write punch cards or alternatively to translate or read already punched cards and to record the punch card data on tapes or other data storage means.

4 Claims, 4 Drawing Figures

INVENTOR.
RAYMOND W. LIMBERT
BY James J. Cannon
ATTORNEY

Patented March 7, 1972 3,648,036

3 Sheets-Sheet 2

INVENTOR
RAYMOND W. LIMBERT
BY James J. Cannon
ATTORNEY.

Patented March 7, 1972 3,648,036

3 Sheets-Sheet 3

INVENTOR.

RAYMOND W. LIMBERT

BY

James J. Cannon

ATTORNEY

CARD PUNCH READER ADAPTER

BACKGROUND OF THE INVENTION

The present invention relates to data handling and storage and in particular relates to a system used for translating encoded data back and forth between one encoding medium and another and particularly between a card punch machine and an electrical or magnetic storage medium such as a magnetic tape or another electronic memory circuit. In particular, an improved translator circuit is provided for transferring encoded data from one medium to another where the transfer requires a change in the handling rate of the data where the data is transferred between a faster operating system as, for example, a magnetic tape and a slower operating system of the punch card variety.

Additionally, the improved system includes integral code translating means for performing a code translation during the transmission of the data. The system is particularly adapted for use with card punch machines of the type used for processing HOllerith-type cards and is adaptable for use with existing card punches as it operates without a direct electric interconnection between itself and the card punch so that there are no common current paths between the translator and the card punch.

Accordingly, an object of the present invention is to provide an improved code translator system.

Another object of the present invention is to provide an improved translator system for converting magnetically or electrically encoded data to punch card encoded data and vice versa.

Another object of the present invention is to provide a simplified code translator system adaptable for use between serially operated and parallel operated encoding system.

Another object of the present invention is to provide an improved code translator system involving punch card encoded data where the control of the punching circuits is accomplished with a minimum number of operating relays for both reading and writing operations on the punch cards.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein.

DESCRIPTION OF THE PREFERRED EMBODIMENT

The card punch reader adapter in accordance with the present invention provides a system for directly coupling a source of data at a data management terminal to a card punch, such as the well known types used to punch Hollerith-type cards. The adapter in accordance with the invention may be used in feeding the data to the card punch for punching cards or alternatively it may be used for transferring data from punch cards to a storage medium at the data management terminal such as a magnetic tape or other storage medium.

In order to perform this operation in a typical data system or for a data management terminal which includes data recorded on a recording medium in a code such as the well known ASCII code or a similar code, the adapter basically performs four main operations.

One of these operations is a conversion of the code used at the data management terminal to the code being used in the card punch and in a typical application, this requires a conversion from the ASCII code to a code such as the Hollerith code used in many card punches.

A second operation performed by the adapter is to make the necessary speed changes to adapt the operating speeds of the data management terminal, or the buffer output where a buffer is used, to the operating speed of the particular card punch being employed.

Additionally, the adapter provides for electrical compatibility between the adapter and the card punch so that the particular operating input characteristics of the card punch are accommodated for and so that the internal circuits of the card punch and the adapter are protected.

In addition, an important operation performed in the adapter provides for a conversion from the serial operating modes of typical data management terminal data storage devices to the parallel mode of operation of typical card punches.

Figures 1, 2:
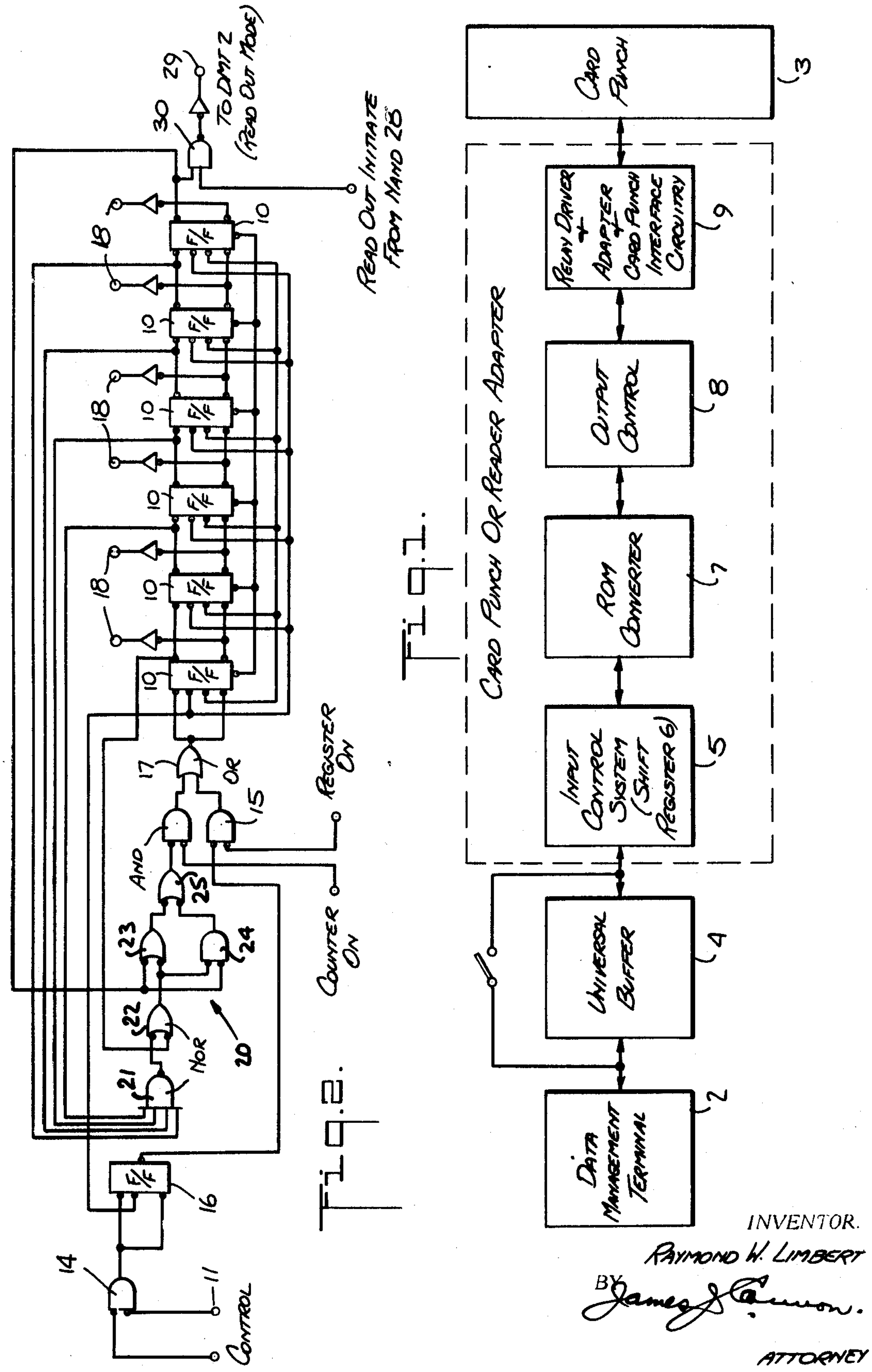
FIG. 1 is a diagrammatic illustration of the preferred embodiment of the card punch or reader adapter utilized between a data management terminal and a card punch.
FIG. 2 is a diagrammatic illustration of a preferred input control system in accordance with the present invention.

FIG. 1 is a schematic or block diagram illustrating the several main circuits which are coupled together in the adapter 1 and it also illustrates the related input and output devices for which the adapter is provided.

The left-hand block in FIG. 1 illustrates a typical data management terminal 2 which may be a data processing device including one or more means for at least temporarily recording or storing data. The device may include removable data storage means such as magnetic tapes or discs or other members and it also may include internal data storage circuits. The output of these storage means may be coupled to a card punch device 3 to transfer the data to punch cards by coupling the terminal 2 output through the adapter 1 of the present invention.

If desired, a universal buffer 4 may be connected between the terminal 2 and the adapter 1 to save terminal time. These buffer 4 circuits which form no part of the present invention are well known. The buffers 4 are adapted to receive data at extremely high speeds at their input and to thereafter selectively feed this data from their outputs to the adapter 1 at differing rates and at controlled intervals. This permits the data which is to be transferred to punch cards to be rapidly fed out of the terminal 2 independently of the operation of the adapter 1 and the card punch 3 and permits the terminal 2 to be returned to other operations as the adapter 1 operates in its regular manner with the card punch 3 and over a longer period.

As seen in FIG. 1, the card punch reader adapter 1 itself comprises three principle subcircuits. The first of these circuits is shown as an input control system 5. This circuit may be described generally as a control circuit including a modified shift register. It controls the timing of the transfer of data to and from the adapter 1. It receives the encoded data from the terminal 2 in serial form as the data is fed into the shift register of the control system 5. The output of the shift register 6 is connected in parallel so that the serially fed input is available as a parallel output.

The second principle circuit in the card punch reader adapter 1 is the code translation circuit which preferably comprises a read only memory (ROM) 7 which is wired to translate the particular code being used at the terminal 2 into the code being fed to the card punch 3. A typical example of a ROM 7 as used in the adapter would be wired so that an ASCII code fed in a parallel from the shift register 6 of the input control system 5 would appear in parallel arrangement on the ROM 7 output as a Hollerith code arranged in a parallel mode.

This Hollerith code, which is to be used to operate the card punch 3 to punch the Hollerith or other cards, is made electrically compatible with the card punch 3 in the third principle circuit which is designated as an output control circuit 8.

Typical card punch machines 3 have an input consisting of one input line for each row of holes to be punched as, for example, the 12 input lines used in conventional Hollerith card punches for punching Hollerith cards which have their data encoded in 80 columns and 12 rows. In general, the output control circuit 8 provides the necessary 12 punching signals and additional control signals through a relay operated interface where the circuits of the adapter 1 are electrically isolated from the circuits of the card punch 3 by relays. The relay solenoids of the relay driver and adapter 1 are operated by the adapter 1 circuits and the electrically isolated contacts for these relays operate in card punch 3 circuits or vice versa. In this manner, the card punch 3 itself is electrically isolated from the adapter 1 circuits so that the adapter 1 may operate with differing voltages and current capacities which are chosen for their suitability for the adapter 1 functions and which may differ considerably from the operating voltages of the card punch 3.

This arrangement for the adapter 1 circuits also permits the adapter 1 to be used directly with a variety of card punch arrangements without internal modification of the card punch and generally the incoming and outgoing information may be passed between the card punch 3 and adapter 1 by removably tapping the adapter output into the regular card punch 3 input lines.

The same general circuitry shown in FIG. 1 and briefly described above in connection with a card punching operation is also employed in a novel manner for translating encoded information from punch cards to other storage means at the data management terminal. Prior systems of this type have required an additional ROM or other code conversion circuit to translate Hollerith card data to the ASCII data. The improved translator of the present invention operates in the following manner to eliminate the need for this additional ROM translating circuit.

The punch card reader 3 is set to read out the Hollerith code in parallel mode into the output control circuit 8. At the same time, the shift register 6 in the input control system 5 is converted to a self-cycling counter so that the shift register runs through all possible ASCII combinations and feeds them from its parallel output through the regular ASCII to Hollerith ROM 7 (as described above in connection with the punching operation). The output of the ROM 7 is also fed in parallel to he output control 5 where it is compared with the Hollerith data being fed in from the card being read in the card punch 3. When the output from the ROM 7 matches the output from the card punch 3, a stop signal is sent to the counter of the converted shift register 6 indicating that the correct code has been determined and the particular code on the shift register 6 is then fed into the data management terminal 2 to be serially recorded on the particular recording medium being used. This is seen to provide an adapter 1 useful both for punching and for reading with a minimum amount of circuitry.

INPUT CONTROL SYSTEM

As already indicated above, the input control circuit 5 is provided to convert the ASCII serial mode input to an ASCII parallel mode output so that the bits of the output may be simultaneously applied to the input terminals of the ROM code converting matrix in the ROM converter 7.

FIG. 2 illustrates in diagrammatic for a counter or shift register 6 employed for this purpose illustrating six flip-flop circuits 10 having their input coupled to the output 11 of the data management terminal 2 or the universal buffer output 12 through control and gates 14 and 15, flip-flop 16 and/or gate 17 and having the six output terminals 18 of the shift register for feeding the ROM inputs through drivers 19.

When the adapter circuit 1 is being used in the read mode where punch card data is being fed back and recorded on a magnetic tape or otherwise at the terminal 2, the output control system 8 is used, as already noted above, as a compare circuit. For this purpose, the serial to parallel shift register 6 including the six flip-flop circuits 10 shown in FIG. 2 is converted to a self-cycling counter. This is done by the feedback circuit 20 shown at the left side of FIG. 2 where the several flip-flop outputs are fed back to the shift register input through the NOR gates 21–25 thereby converting the register 6 to a counter which automatically steps through the 64 combinations available in a six stage register. The 64 counts are each fed from the shift register parallel outputs 18 through the ROM 7 to the ROM inputs 32 of the compare and output control circuit 8 shown in FIG. 3 providing inputs at the NAND gate 26 through NAND control gates 31 and/or gates 27. When a match is obtained between the counter output as fed to NAND gate 26 and the punch card output simultaneously being fed into the compare circuit through card punch feed terminals CPF 1 through CPF 12. The 24 NOR gates 28 are inserted to provide a temporary storage for the punch card read signal to provide for an immediate release of the card punch reading prior to the completion of the compare operation.

The output of the NAND gate 26 stops the counter to restore it to a shift register and to provide a serial readout from terminal 29 through gate 30.

THE ROM OR CODE CONVERTER

As already indicated, a principle function of the adapter 1 is to convert the code being used at the data management terminal 2 to the code being used at the card punch 3. For example, the ROM 7 in a typical system would be used to translate an ASCII code to a Hollerith code. A preferred circuit for this purpose may be a conventional and commercially available read only memory (ROM) circuit which may be obtained as necessary and wired to convert a parallel input in one code, such as an ASCII, to a parallel output in a differing code and with a differing number of slots or bits.

In a typical system, such as the preferred embodiment being described herein, the ASCII code will include six or seven bits which when presented in parallel mode to an ROM comprise separate signals having two states, i.e., a high and a low state often referred to as the "0" or "I" signal levels. The ROM matrix may be used in a conventional manner to translate all possible combinations of this input code to a Hollerith code which consist of a differing number of bits such as 12 bits or slots and in which one or more of the slots will have the high or 1 voltage level while the remaining slots have the low or 0 signal level.

Figure 3:
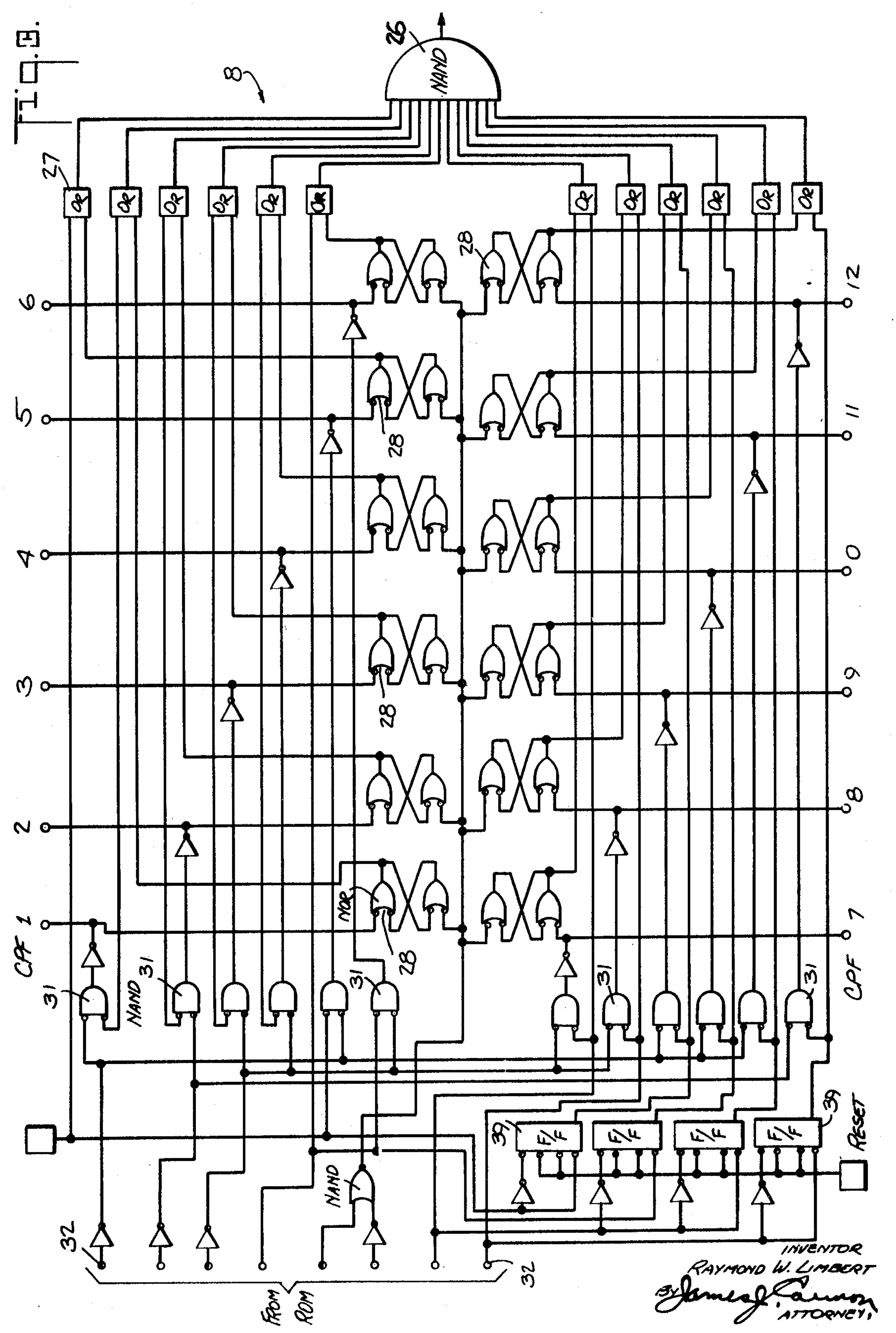
FIG. 3 is a schematic logic diagram illustrating a preferred embodiment of the translator output control system.

The output of the ROM 7 is coupled to the card punch 3 through the output control 8 and the relay driver 9. FIG. 3 illustrates an eight terminal ROM output 32 coupled to the terminals 32 of the output control 8. In the case where the card punch code includes 8 bits, a control circuit would couple each of the terminals 32 to corresponding output terminals CPF through appropriate control gates 31. FIG. 3 shows four flip-flop storage circuits 39 in its lower left-hand corner which are used in a manner which will be described below as an alternate embodiment to utilize an eight output terminal ROM with a 12 bit card punch code.

THE OUTPUT CONTROL CIRCUIT AND RELAY DRIVER

The output control circuit 8 receives the translated code signals from the ROM 7 in the proper code form for providing the punched code on the Hollerith cards at the card punch 3. The output control circuit 8 as already described coupled the translated code to the card punch through the relay driver 9, which electrically isolates the card punch 3 from the adapter 1 circuits. As has also been explained, the output control circuit 8 is used to convert from a punching or writing operation at the card punch to a reading operation where already punched cards have their data read or transferred to another recording medium.

Figure 4:
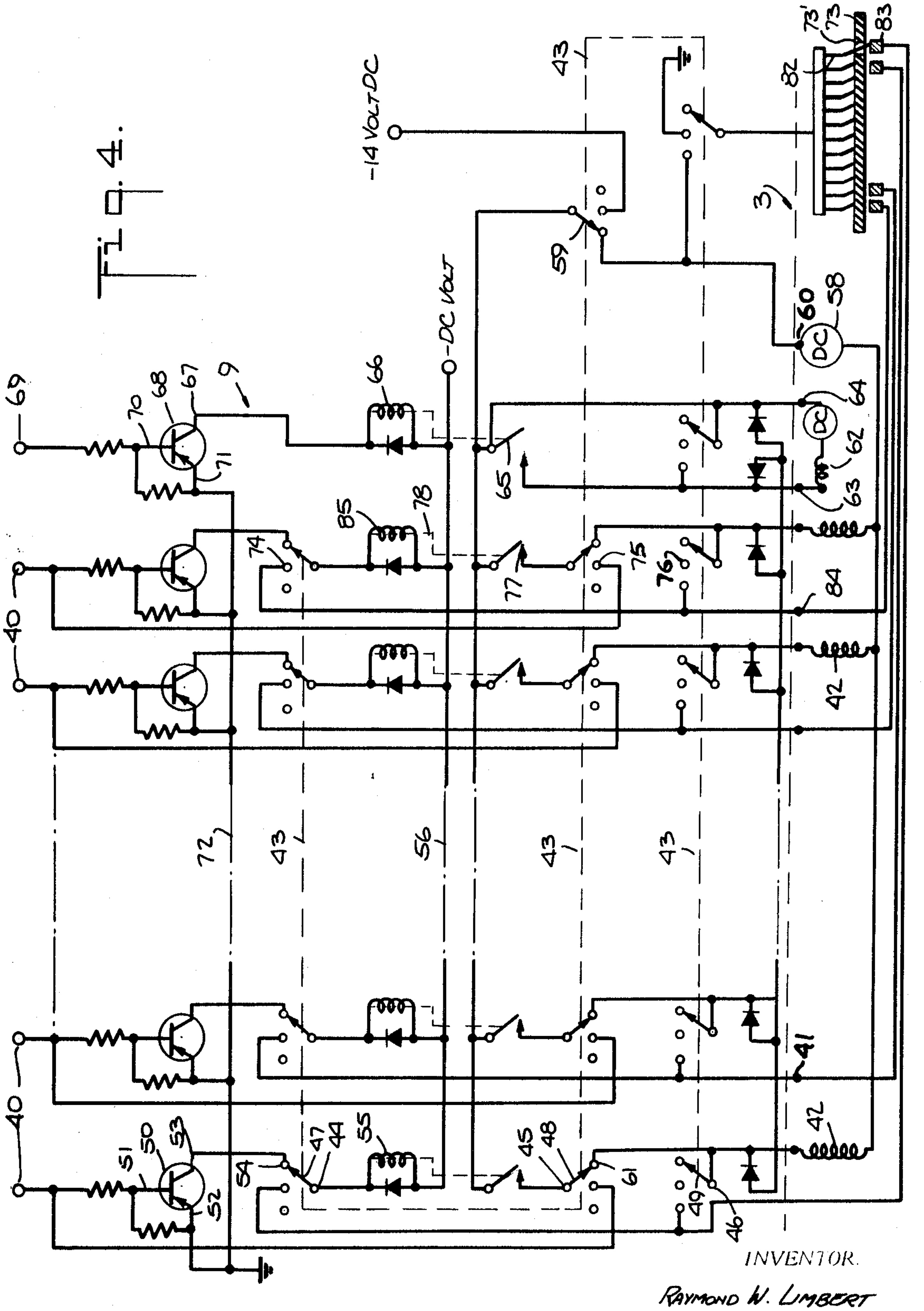
FIG. 4 is a schematic diagram illustrating a preferred embodiment of the output control relay board for the card punch or reader adapter.

FIG. 4 is a schematic diagram illustrating a preferred embodiment of the relay driver 9.

At the top of the circuit, a number of inputs 40 are shown. Each of these inputs corresponds to one of the numbered rows on the punch cards and 12 inputs are provided for a standard Hollerith card. These inputs 40 are coupled to the outputs of the ROM through terminals CPF 1 through CPF 12 on the output control 8.

Each of the 12 inputs 40 are coupled through circuitry, to be described below, to an output terminal 41 shown at the bottom of FIG. 4. These output terminals 41 provide a punching signal to activate 12 punches including activating solenoids as illustrated at 42 below the output terminals 41.

The operation of the relay driver circuit 9, when it is operating in the punching mode, will be described in connection with the receipt of a punch signal at input 40. Each of the other terminals 40 operate in a similar fashion.

A 36 pole three position gang switch 43 is provided with three poles 44, 45 and 46 used for each of the terminal circuits as shown. The switch arms 47, 48 and 49 for the contacts 44, 45 and 46 are shown in FIG. 4 in the punching position. Simultaneous movement of the switch arms first turns the switch contacts to the readout position and finally turns the switches to an "off position" which disconnects the adapter 1 from the card punch 3 to permit local or regular manual card punch operation independently of the adapter system.

In the absence of a punch signal, terminal 40 will be at a raised or high voltage with transistor 50 cut off. When it is desired to punch a card in a column controlled by a terminal 40, the ROM output connected to that terminal 40 will be driven low. This will drive the base 51 of the transistor 50 low causing current to flow from the emitter 52 to the collector 53. The emitter 52 is seen coupled to ground and the current flow path is from ground to the transistor 50 through switch contact 54 and thence through a solenoid coil 55 and the common solenoid connecting line 56 to a negative DC voltage. Thus, when transistor 50 is cut on by a low or punching signal at terminal 40, the relay contact 57 actuated by related solenoid 55 is closed. The closing of this contact 57 is seen to connect a DC voltage source 58 to the card punch operating solenoid 42 through the output control circuit which includes the relay contact 57, switch contact 59, output terminal 60, the punch actuating solenoid 42, and a return path through the terminal 41 and switch contact 61.

An internal start control relay solenoid for the card punch machine 3 is illustrated at 62 at the bottom of FIG. 4 connected between terminals 63 and 64. This card punch relay solenoid 62 is controlled fro the adapter circuit 1 through the intermediation of the adapter relay contacts 65 controlled by its related solenoid 66. The solenoid 66 is seen to be coupled between a DC voltage source and the collector 67 of transistor 68. A control signal is fed to the card punch 3 by placing a start signal on the output control circuit terminal 69 to drive the transistor 68 base 70 low thereby permitting current to flow to the DC voltage source through the relay coil 66 from the transistor 68 emitter 71 to ground along common ground line 72.

The relay driver 9 includes the rotary gang switch 43 which is turned to its center position when the adapter 1 is being used to transfer data from punch cards 73 at the card punch 3 to other encoding means at the data management terminal 2. The function of the relay driver 9 is then altered to perform the read operation. In this operation, the punch card data is transferred to the output control 8 and the above described comparator system. As already indicated, the shift register 6 of the input control system 5 is run as a circulating counter during the readout operation and the data from the card punch 3 is fed to and compared with the translated counter output until there is a match. At this point, the counter is stopped and the reading of the shift register, which matches that of the punchcard 73, is fed to and recorded on the recording medium at the data management terminal 2.

In order to perform this operation at the relay driver 9, the rotary gang switch 43 is turned to its center position in which its contacts are coupled to the center switch contacts 74, 75 and 76 on FIG. 4. The readout operation will now be described for the sensing of a punched hole 73′ in the right hand row on card 73 corresponding to the right hand terminal 40. In order to indicate that there is a punched hole 73′ at this position, the right hand input terminal 40 must be driven to its low position by placing a negative DC voltage on this terminal 40. This is done by coupling the −14 volt DC voltage to this terminal 40 through contact 77 of the relay 78. It is seen of FIG. 4 that closing the contact 77 places the −14 volt DC voltage onto the right-hand terminal 40 through common coupling line 79 and contacts 59 and 75 of the rotary switch 43. The presence of the hole 73′ in card 73 closes the contact 77 of the relay 78 in the following manner. A series of conductive feelers 82 are positioned to engage the punch card 73 in the card punch 3 and to pass through the punched holes to engage contacts 83 which are coupled to the read inputs 84. This grounds the upper end of the relay coil 85 causing current to flow through it from the −DCV voltage source thereby causing the contact 77 to close placing the −14 volt DC voltage or hole-indicating voltage on the right hand terminal 40 as already described. This voltage is then fed into the output control 8 for the above described comparison with the counter generated code.

ALTERNATE EMBODIMENT OF THE ROM OUTPUT CONTROL CIRCUITS

As already described, the ROM converter 7 in the adapter circuit 1 is provided to convert particular input such as an ASCII code to a suitable punch card code which may be a Hollerith code. Where the data management terminal 2 code has a lesser number of digits or slots than the card punch code, the ROM may be conventionally wired to provide the proper translation including a change in the number of digits between the input and punch card codes.

FIG. 3 at its left-hand side illustrates four flip-flop storage circuits 39 coupled to the eight terminals 32 which are coupled to ROM 7 outputs. These flip-flops 39 may be used in the following manner to provide a translation for a code having a certain number of digits to a second code having a larger number of digits where the ROM 7 itself may have an insufficient number of output terminals for the second code.

In this modification, the input code is divided into separate sections and these sections are successively addressed to the ROM. The first ROM output, or a portion of it, is fed into the flip-flops 39 and is temporarily stored therein. When the second input section is fed into the ROM and translated, the second translated output is fed directly through the control circuit 8 while the additional characters already stored in the flip-flop 39 are simultaneously fed to additional control terminal outputs. In this manner, for example, a 12 character Hollerith code translation may be obtained by successive translations in a ROM having only eight output terminals. In this case, the input code is divided and successively fed to the ROM with four characters being initially stored in the flip-flop circuits 39 shown in FIG. 3 for a subsequent readout after the translation for the next eight digits.

It will be seen that an improved adapter system has been provided for translating recorded data from one medium to another and, in particular to transfer data in either direction between punch cards and magnetic tape or other storage means. The adapter in accordance with the present invention includes a unique means for isolating the card punch apparatus from the translating or adapter circuit. In addition, the circuit in accordance with the present invention makes a novel double use of relays and of shift register circuits to minimize the complexity of the adapter which alternatively is useful both to prepare punch cards or to translate punch cards to another medium. The adapter, as described, also includes a novel means for a code translation to a code having more bits or spaces than has the output circuit of the ROM or other translating circuit.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A means for transferring encoded data between a punch card recording medium and a differing recording medium comprising the combination of a code translation means, relay means for coupling the translation means to a card-punching means, a serial to parallel data storage means for receiving data from said differing recording medium, means for coupling said storage means to said translating means, means to convert said relay means to a punch card code reading means, means for successively generating all characters of a code, and means for comparing the code read by said relay means with the successive characters generated by said code generating means.

2. The means as claimed in claim 1 in which said code generating means is a counter.

3. The means as claimed in claim 1 in which said first named storage means comprises a shift register and said code generating means comprises means for converting said shift register to a self-cycling counter.

4. A means for transferring encoded data to a card punch including punch control solenoids comprising the combination of a serial to parallel shift register having its serial input coupled to a data source, a read only memory code translation means having its input coupled to the parallel output of said shift register, a relay driver means having a plurality of relays with the relay solenoids electrically coupled to the output of said code translation means, the contacts of said relays being coupled to said punch contact solenoids, a second data storage means coupled between said read only memory and said relay driver means, means for combining data stored in said second storage means with additional data supplied by said read only memory means for simultaneous transmission to said relay driver means, means to convert said relay driver means to a punch card code reading means, a counting means for successively generating all characters of a code, and means for comparing the code read by said relay driver means with the successive characters generated by said counting means.

* * * * *